(12) United States Patent
Guichard et al.

(10) Patent No.: US 11,591,425 B2
(45) Date of Patent: Feb. 28, 2023

(54) CURABLE COMPOSITIONS AND USES THEREOF

(71) Applicant: Arkema France, Colombes (FR)

(72) Inventors: Margaux Guichard, Philadelphia, PA (US); Brendan T. McGrail, Phoenixville, PA (US); William C. Wolf, Philadelphia, PA (US); Jeffrey A. Klang, West Chester, PA (US)

(73) Assignee: Arkema France, Colombes (FR)

( * ) Notice: Subject to any disclaimer, the term of this patent is extended or adjusted under 35 U.S.C. 154(b) by 233 days.

(21) Appl. No.: 16/617,085

(22) PCT Filed: May 23, 2018

(86) PCT No.: PCT/EP2018/063465
§ 371 (c)(1),
(2) Date: Nov. 26, 2019

(87) PCT Pub. No.: WO2018/219729
PCT Pub. Date: Dec. 6, 2018

(65) Prior Publication Data
US 2020/0277423 A1 Sep. 3, 2020

Related U.S. Application Data

(60) Provisional application No. 62/514,204, filed on Jun. 2, 2017.

(51) Int. Cl.
| | |
|---|---|
| *C08F 220/18* | (2006.01) |
| *B33Y 70/00* | (2020.01) |
| *C08F 222/14* | (2006.01) |
| *B33Y 10/00* | (2015.01) |
| *B29C 64/10* | (2017.01) |
| *B29K 105/00* | (2006.01) |
| *C08F 222/10* | (2006.01) |

(52) U.S. Cl.
CPC ......... *C08F 220/1811* (2020.02); *B33Y 70/00* (2014.12); *C08F 222/14* (2013.01); *C08F 222/145* (2020.02); *B29C 64/10* (2017.08); *B29K 2105/0002* (2013.01); *B33Y 10/00* (2014.12); *C08F 222/1065* (2020.02)

(58) Field of Classification Search
CPC ... B33Y 70/00; B33Y 10/00; C08F 220/1811; C08F 222/145; C08F 222/14; C08F 222/1065; B29C 64/10; B29K 2105/0002
USPC ......................................................... 524/1
See application file for complete search history.

(56) References Cited

U.S. PATENT DOCUMENTS

| | | | |
|---|---|---|---|
| 2,313,501 A | 3/1943 | Bachman | |
| 2,330,033 A | 9/1943 | D'Alello | |
| 3,221,745 A | 12/1965 | Coover, Jr. et al. | |
| 3,523,097 A | 8/1970 | Coover, Jr. et al. | |
| 3,557,185 A | 1/1971 | Ito et al. | |
| 3,758,550 A | 9/1973 | Eck et al. | |
| 3,975,422 A | 8/1976 | Buck | |
| 4,049,698 A | 9/1977 | Hawkins et al. | |
| 4,056,543 A | 11/1977 | Ponticello | |
| 4,160,864 A | 7/1979 | Ponticello et al. | |
| 4,707,076 A * | 11/1987 | Skutnik ............. | G02B 6/02033 385/128 |
| 4,931,584 A | 6/1990 | Bru-Magniez et al. | |
| 5,142,098 A | 8/1992 | Bru-Magniez et al. | |
| 5,550,172 A | 8/1996 | Regula et al. | |
| 6,106,807 A | 8/2000 | Albayrak et al. | |
| 6,211,273 B1 | 4/2001 | Bru-Magniez et al. | |
| 6,245,933 B1 | 6/2001 | Malofsky et al. | |
| 6,420,468 B2 | 7/2002 | Bru-Magniez et al. | |
| 6,440,461 B1 | 8/2002 | Bru-Magniez et al. | |
| 6,512,023 B1 | 1/2003 | Malofsky et al. | |
| 6,610,078 B1 | 8/2003 | Bru-Magniez et al. | |
| 6,699,928 B2 | 3/2004 | Cobbley et al. | |
| 6,750,298 B1 | 6/2004 | Bru-Magniez et al. | |
| 8,609,885 B2 | 12/2013 | Malofsky et al. | |
| 9,181,365 B2 | 11/2015 | Malofsky et al. | |
| 9,567,475 B1 * | 2/2017 | Palsule ................. | C08G 63/78 |
| 2004/0076601 A1 | 4/2004 | Bru-Magniez et al. | |
| 2014/0275400 A1 | 9/2014 | Chen et al. | |
| 2015/0218081 A1 | 8/2015 | Malofsky et al. | |

FOREIGN PATENT DOCUMENTS

| | | | |
|---|---|---|---|
| DE | 102015105993 A1 * | 10/2016 | |
| DE | 102015105993 A1 | 10/2016 | |
| FR | 2684681 A1 | 11/1993 | |
| JP | H1087566 A | 4/1998 | |
| JP | 2000327724 A2 | 11/2000 | |
| WO | 2012054616 A2 | 4/2012 | |
| WO | 2012054633 A2 | 4/2012 | |
| WO | WO2017009184 A1 | 1/2017 | |
| WO | 2019014528 A1 | 1/2019 | |

OTHER PUBLICATIONS

International Search Report of International Application No. PCT/EP2018/063465 dated Aug. 29, 2018.
Bachman, G. B. and Tanner, H. A., J. Org. Chem., 1939, 4, 493-501.

* cited by examiner

Primary Examiner — Michael M. Bernshteyn
(74) Attorney, Agent, or Firm — Christopher R. Lewis

(57) ABSTRACT

Curable compositions having desirable attributes such as rapid curing rates and enhanced physical properties are prepared using admixtures of one or more (meth)acrylate-functionalized compounds and one or more reactive comonomers, such as 1,1-diester-1-alkenes (e.g., methylene malonates), 1,1-diketo-1-alkenes, 1-ester-1-keto-1-alkenes and/or icatonates.

19 Claims, 2 Drawing Sheets

FIG. 1: Cumulative enthalpy with time of exposure

FIG. 2 : FTIR results on conversion with time of exposure

CURABLE COMPOSITIONS AND USES THEREOF

CROSS-REFERENCE TO RELATED APPLICATIONS

This application is a U.S. national stage application under 35 U.S.C. § 371 of PCT/EP2018/063465, filed May 23, 2018, which claims the benefit of U.S. Patent Application No. 62/514,204, filed Jun. 2, 2017.

FIELD OF THE INVENTION

The present invention relates to curable compositions. In particular, the invention pertains to compositions based on admixtures of (meth)acrylate-functionalized compounds and reactive comonomers (e.g., 1,1-diester-1-alkenes, 1,1-diketo-1-alkenes, 1-ester-1-keto-1-alkenes and/or icatonates, including methylene malonates and/or methylene beta-diketones) which are capable of being cured by exposure to radiation (e.g., ultraviolet radiation). The curable compositions are useful as coatings, inks, adhesives, molding resins and 3D printing resins, among other applications.

BACKGROUND OF THE INVENTION

Radiation-curable compositions based on various types of (meth)acrylate-functionalized compounds (i.e., compounds containing one or more acrylate and/or methacrylate functional groups per molecule, including both monomers and oligomers) have been known for many years and enjoy wide use in a number of applications, including as formulations for coatings, sealants, adhesives, inks, 3D printing inks and molding resins. Generally speaking, methacrylate-functionalized compounds are typically used to provide improvements in the physical properties of the cured formulation (e.g., higher strength, higher glass transition temperature, greater chemical resistance), while acrylate-functionalized compounds are typically employed to promote a faster rate of reaction (i.e., a faster cure rate, when the radiation-curable composition is exposed to radiation). Rapid curing is highly desirable in many end-use applications, as productivity increases and other advantages can thereby be achieved. But at the same time, the physical properties of the cured composition should desirably continue to meet certain minimum performance requirements. While increasing the proportion of acrylate-functionalized compound in a radiation-curable formulation may increase its rate of curing, this often comes at the expense of compromising to some extent the physical properties in the cured product that would otherwise be achieved if only methacrylate-functionalized compounds were present. Many low-functionality acrylate/methacrylate resins (i.e., resins having a low number of (meth)acrylate groups per mole) show poor cure speed using conventional radiation sources, particularly when using long wavelength LED curing systems. Moreover, the acrylate-functionalized compounds (especially acrylate-functionalized monomers) tend to be more irritating and to have greater health hazard issues as compared to their methacrylate-functionalized counterparts.

SUMMARY OF THE INVENTION

Accordingly, it would be desirable to develop radiation-curable compositions in which the content of acrylate-functionalized compounds can be reduced while still providing a high rate of cure and suitably high physical properties in the cured product obtained therefrom.

It has now been discovered that the curing characteristics of compositions based on (meth)acrylate-functionalized compounds may be advantageously controlled or varied by including in such compositions one or more reactive monomers (comonomers) in which a carbon atom that is part of an alkene (C=C) moiety is di-substituted with carbonyl-containing substituents such as ketone, ester or amide groups. In particular, formulations based on a combination of one or more methacrylate-functionalized compounds and one or more such reactive comonomers (e.g., methylene malonates) have been found to exhibit much faster curing when exposed to ultraviolet radiation as compared to analogous formulations based on combinations of methacrylate-functionalized compounds and acrylate-functionalized compounds. The faster cure rates mean that the reactive comonomer-containing formulations reach their rheological gel points (i.e., solidify) with substantially lower UV exposures. Thus, the incorporation of such reactive comonomers helps to improve the cure kinetics and also the physical properties of radiation-curable formulations based on (meth)acrylate-functionalized compounds, with a clear synergetic effect due to the presence of such a comonomer.

According to one aspect of the invention, a curable composition is provided which is comprised of:

a) at least one comonomer having structure $R^aR^bC=CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^i$, with each $R^i$ being independently selected from H or an organic group, wherein $R^c$ is H or an alkyl in C1 or C2 and each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring; and b) at least one (meth)acrylate-functionalized compound.

The curable compositions in accordance with the present invention may be cured (using radiation, for example) to provide cured compositions. Accordingly, the curable compositions may be used as adhesives, sealants, inks, 3D printing resins or molding resins to prepare various types of articles (such as three dimensional printed articles or 3D article, for example which is part of the invention).

DETAILED DESCRIPTION OF THE INVENTION

Comonomers a)

The curable compositions of the present invention are comprised of (at least one) one or more comonomers a) which may be generally characterized as compounds containing a reactive carbon-carbon double bond (i.e., a site of ethylenic unsaturation) wherein one of the carbon atoms involved in the carbon-carbon double bond is substituted by two C=O (carbonyl) containing groups, wherein such car- bon atom of the carbon-carbon double bond is directly bonded to the carbon atom of the C=O moiety in each of the two C=O containing groups or directly bonded to the carbon atom of the C=O moiety in one of the two C=O containing groups and indirectly bonded to the carbon atom of the C=O moiety in the other C=O containing group through an intermediate —CH$_2$— group (resulting in the moiety C=C—CH$_2$—C(=O)—). The other carbon atom involved in the carbon-carbon double bond is either unsubstituted (resulting in a terminal methylene group, C=CH$_2$) or substituted with a C$_1$ or C$_2$ alkyl group (resulting in an alkene group C=CHCH$_3$ or C=CCH$_2$CH$_3$).

Reactive comonomers useful in the present invention may have the general structure R$^a$R$^b$C=CHR$^c$, wherein R$^a$ and R$^b$ are the same as or different from each other and are selected from —C(=O)XR$^d$, —CH$_2$C(=O)XR$^e$, and —C(=O)R$^f$, subject to the proviso that R$^a$ and R$^b$ are not both —CH$_2$C(=O)XR$^e$; wherein each X is independently O or NR$^i$, with each R$^i$ being independently selected from H or an organic group, wherein R$^c$ is H or an alkyl in C1 or C2 and each R$^d$ and R$^e$ is independently selected from H, alkali metal, or an organic group (wherein the organic group can be, for example, an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group or a polyoxyalkylene group); and wherein each R$^f$ is independently selected from an organic group (such as an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group, an oxyalkylene or a polyoxyalkylene group); or wherein two of R$^d$, R$^e$ or R$^f$ are taken together with the atoms to which they are bound to form a ring. When R$^d$, R$^e$ or R$^f$ is an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group or a polyoxyalkylene group, such group may be substituted by one or more substituents. Any of the substituents known in the field of organic chemistry may be present, including, for example, halo, nitro, cyano, alkoxy, hydroxy and the like and combinations thereof, provided that such substituent(s) does not interfere with the ability of the comonomer to co-cure with the (meth)acrylate-functionalized compound(s).

Suitable types of reactive comonomers useful in the present invention include, but are not limited to, 1,1-diester-1-alkenes, 1,1-diketo-1-alkenes, 1-ester-1-keto-1-alkenes, 1,1-diamide-1-alkenes, 1-amide-1-keto-1-alkenes, 1-amide-1-ester-1-alkenes and/or icatonates. The comonomer(s) may, in certain aspects of the invention, be selected from the group consisting of methylene malonates (which may be considered a type of 1,1-diester-1-alkene), methylene acetyl acetonates (which may be considered a type of 1-ester-1-keto-1-alkene), methylene beta-diketones (which may be considered a type of 1,1-diketo-1-alkene), and itaconates. In one embodiment of the invention, only one type of reactive comonomer is present in the curable composition. In such an embodiment, the curable composition may contain only a single particular compound as the comonomer component. However, it is also possible for the curable composition to contain, as the comonomer component, a combination of two or more comonomer compounds of the same type (for example, two or more particular methylene malonate compounds). In other embodiments, the curable composition comprises two or more types of reactive comonomers (for example, both a methylene malonate and a methylene beta-diketone).

The terminal methylene-containing compounds are characterized by containing at least one methylene (=CH$_2$) group per molecule, wherein the carbon atom to which such methylene group is attached is substituted, for example, by two ester groups (—C(=O)OR), by two ketone groups (—C(=O)R) or by both an ester group and a ketone group, wherein R is an organic group such as alkyl or cycloalkyl (as will be explained in more detail subsequently).

According to certain aspects of the invention, one or more methylene malonates are present in the curable composition as comonomer a) which have a structure (I):

wherein R and R' are independently C$_1$-C$_{15}$ alkyl, C$_2$-C$_{15}$ alkenyl, halo-(C$_1$-C$_{15}$ alkyl), C$_3$-C$_{12}$ cycloalkyl, halo-(C$_3$-C$_{12}$ cycloalkyl), heterocyclyl, heterocyclyl-(C$_1$-C$_{15}$ alkyl), aryl, aryl-(C$_1$-C$_{15}$ alkyl), heteroaryl, heteroaryl-(C$_1$-C$_{15}$ alkyl), or alkoxy-(C$_1$-C$_{15}$ alkyl), each of which may be optionally substituted by C$_1$-C$_{15}$ alkyl, halo-(C$_1$-C$_{15}$ alkyl), C$_3$-C$_{12}$ cycloalkyl, halo-(C$_3$-C$_{12}$ cycloalkyl), heterocyclyl, heterocyclyl-(C$_1$-C$_{15}$ alkyl), aryl, aryl-(C$_1$-C$_{15}$ alkyl), heteroaryl, C$_1$-C$_{15}$ alkoxy, C$_1$-C$_{15}$ alkylthio, halo, hydroxyl, nitro, azido, cyano, acyloxy, carboxy, or ester; or wherein R and R' are taken together with the atoms to which they are bound to form a 5-7 membered heterocyclic ring which may be optionally substituted by C$_1$-C$_{15}$ alkyl, halo-(C$_1$-C$_{15}$ alkyl), C$_3$-C$_{12}$ cycloalkyl, halo-(C$_3$-C$_{12}$ cycloalkyl), heterocyclyl, heterocyclyl-(C$_1$-C$_{15}$ alkyl), aryl, aryl-(C$_1$-C$_{15}$ alkyl), heteroaryl, C$_1$-C$_{15}$ alkoxy, C$_1$-C$_{15}$ alkylthio, halo, hydroxyl, nitro, azido, cyano, acyloxy, carboxy, or ester.

In one embodiment of the invention, the curable composition is comprised of at least one methylene malonate of structure (I) wherein one or both of R and R' is a cycloalkyl group or contains a cycloalkyl group, which may be substituted or unsubstituted. Where both R and R' are cycloalkyl groups or contain cycloalkyl groups, the cycloalkyl groups may be the same as or different from each other. The cycloalkyl group may be directly bonded to the oxygen atom of an ester group or indirectly bonded to such oxygen atom (through, for example, an alkylene group, such as —CH$_2$—).

The cycloalkyl group may be a monocyclic alkyl group (substituted or unsubstituted), such as a cyclopentyl, cyclohexyl or cycloheptyl group, or a polycyclic alkyl group (substituted or unsubstituted), such as an isobornyl group or tricyclodecyl group. Suitable polycyclic alkyl groups include polycyclic alkyl groups having a fused ring system, polycyclic alkyl groups having a bridged ring system, as well as polycyclic alkyl groups having both a fused ring system and a bridged ring system.

Illustrative, non-limiting examples of methylene beta-diketones useful as co-monomers in the curable compositions of the present invention include compounds wherein R and R' in the above-mentioned structure (I) are as follows:

R=t-butyl, R'=methyl;
R=R'=ethyl;
R=isopropyl, R'=methyl;

R=phenyl, R'=methyl;
R=R'=phenyl;
R=R'=n-propyl;
R=2-thiophene, R'=trifluoromethyl;
R=t-butyl; R'=trifluoromethyl;
R=n-hexyl, R'=trifluoromethyl;
R=R'=isopropyl;
R=methyl, R'=bromomethyl;
R=2-furanyl, R'=trifluoromethyl;
R=n-propyl, R'=trifluoromethyl;
R=ethyl, R'=trifluoromethyl;
R=methyl, R'=dichloromethyl;
R=phenyl, R'=difluoromethyl;
R=R'=chloromethyl;
R=methyl, R'=difluoromethyl;
R=methyl, R'=chlorodifluoromethyl;
R=methyl, R'=dichloromethyl;
R=4-chlorophenyl, R'=difluoromethyl;
R=methyl, R'=chloromethyl;
R=2,4-dichlorophenyl, R'=trifluoromethyl;
R=2,4-dimethoxyphenyl, R'=methyl;
R=R'=isobornyl;
R=R'=cyclohexyl;
R=ethyl, R'=isobornyl;
R=ethyl, R'=cyclohexyl; and
R=4-methoxyphenyl, R'=methyl.

Particular illustrative methylene malonates include, but are not limited to, the following compounds: diethyl methylene malonate (R=R'=ethyl), di-n-hexyl methylene malonate (R=R'=n-hexyl, di-isobornyl methylene malonate (R=R'=isobornyl), ethyl isobornyl methylene malonate (R=ethyl, R'=isobornyl) and dicyclohexyl methylene malonate (R=R'=cyclohexyl).

Methylene malonate monomers are well known in the art and are described, together with methods for their synthesis, in the following exemplary patent documents, the entire disclosure of each of which is incorporated herein by reference for all purposes: U.S. Pat. Nos. 2,313,501; 2,330,033; 3,221,745; 3,523,097; 3,557,185; 3,758,550; 3,975,422; 4,049,698; 4,056,543; 4,160,864; 4,931,584; 5,142,098; 5,550,172; 6,106,807; 6,211,273; 6,245,933; 6,420,468; 6,440,461; 6,512,023; 6,610,078; 6,699,928; 6,750,298; U.S. Patent Publication No. 2004/0076601; and International Patent Publication Nos. WO/2012/054616A2 and WO2012/054633A2.

In one aspect, the curable composition comprises one or more methylene beta-diketone monomers which have a structure (II):

(II)

wherein $R_1$ and $R_2$ are independently $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester; or wherein $R_1$ and $R_2$ are taken together with the atoms to which they are bound to form a 5-7 membered heterocyclic ring which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester.

Illustrative, non-limiting examples of methylene beta-diketones useful as co-monomers a) in the curable compositions of the present invention include compounds wherein $R_1$ and $R_2$ in the above-mentioned structure (II) are as follows:

$R_1$=t-butyl, $R_2$=methyl;
$R_1$=$R_2$=ethyl;
$R_1$=isopropyl, $R_2$=methyl;
$R_1$=phenyl, $R_2$=methyl;
$R_1$=$R_2$=phenyl;
$R_1$=$R_2$=n-propyl;
$R_1$=2-thiophene, $R_2$=trifluoromethyl;
$R_1$=t-butyl; $R_2$=trifluoromethyl;
$R_1$=n-hexyl, $R_2$=trifluoromethyl;
$R_1$=$R_2$=isopropyl;
$R_1$=methyl, $R_2$=bromomethyl;
$R_1$=2-furanyl, $R_2$=trifluoromethyl;
$R_1$=n-propyl, $R_2$=trifluoromethyl;
$R_1$=ethyl, $R_2$=trifluoromethyl;
$R_1$=methyl, $R_2$=dichloromethyl;
$R_1$=phenyl, $R_2$=difluoromethyl;
$R_1$=$R_2$=chloromethyl;
$R_1$=methyl, $R_2$=difluoromethyl;
$R_1$=methyl, $R_2$=chlorodifluoromethyl;
$R_1$=methyl, $R_2$=dichloromethyl;
$R_1$=4-chlorophenyl, $R_2$=difluoromethyl;
$R_1$=methyl, $R_2$=chloromethyl;
$R_{1=2,4}$-dichlorophenyl, $R_2$=trifluoromethyl;
$R_1$=2,4-dimethoxyphenyl, $R_2$=methyl;
$R_1$=$R_2$=isobornyl;
$R_1$=$R_2$=cyclohexyl;
$R_1$=ethyl, $R_2$=isobornyl;
$R_1$=ethyl, $R_2$=cyclohexyl; and
$R_1$=4-methoxyphenyl, $R_2$=methyl.

Methods of making such methylene beta-diketone compounds are known in the art, including the methods described they in US 2014/0275400 A1 (the entire disclosure of which is incorporated herein by reference in its entirety for all purposes).

A further type of reactive co-monomer that can be used in the curable compositions of the present invention are compounds of the aforementioned structure $R^aR^bC$=$CHR^c$ in which $R^a$ is —C(=O)$OR^d$, $R^b$ is —C(=O)$R^f$ and $R^c$ is H, methyl or ethyl. Such compounds may be referred to alkene beta-ketoesters or 1-ester-1-keto-1-alkenes or, where $R^c$ is H, as methylene beta-ketoesters or methylene acetyl acetonates. Compounds of this type are known in the art and are described, for example, in US 2014/0288230, the disclosure of which is incorporated herein by reference in its entirety for all purposes. Particular illustrative examples of methylene beta-ketoesters suitable for use in the present invention include, but are not limited to, compounds of structure $R^aR^bC$=$CHR^c$ in which $R^c$ is H, $R^a$ is-C(=O)$OR^d$ and $R^b$ is —C(=O)$R^f$ and $R^d$ and $R^f$ are as follows:

$R^d$=methyl, $R^f$=t-butyl;
$R^d$=ethyl, $R^f$=phenyl;
$R^d$=ethyl, $R^f$=n-propyl;

$R^d$=ethyl, $R^f$=methyl;
$R^d$=$R^f$=methyl;
$R^d$=ethyl, $R^f$=isopropyl;
$R^d$=$R^f$=ethyl;
$R^d$=$R^f$=cyclohexyl;
$R^d$=$R^f$=isobornyl;
$R^d$=isobornyl, $R^f$=ethyl;
$R^d$=cyclohexyl, $R^f$=ethyl;
$R^d$=ethyl, $R^f$=benzyl;
$R^d$=ethyl, $R^f$=chloromethyl;
$R^d$=ethyl, $R^f$=thiophene;
$R^d$=ethyl, $R^f$=furanyl;
$R^d$=methyl, $R^f$=chloromethyl;
$R^d$=cyclopentylmethyl, $R^f$=phenyl;
$R^d$=ethyl, $R^f$=difluoromethyl;
$R^d$=tetrahydrofuranylmethyl, $R^f$=phenyl;
$R^d$=ethyl, $R^f$=1-bromo-ethyl;
$R^d$=ethyl, $R^f$=cyclohexyl;
$R^d$=isopropyl, $R^f$=chloromethyl;
$R^d$=ethyl, $R^f$=cyclopentyl;
$R^d$=2-methoxyethyl, $R^f$=methyl;
$R^d$=—CH$_2$CH$_2$OC(=O)CH$_3$, $R^f$=methyl;
$R^d$=furanylmethyl, $R^f$=methyl; and
$R^d$=benzyl, $R^f$=methyl;

The curable compositions of the present invention may comprise one or more itaconates. An itaconate or a combination of two or more different itaconates may be utilized by itself or themselves as the reactive comonomer component of the curable composition. However, in other embodiments, one or more itaconates may be present in combination with one or more other types of reactive comonomers as the reactive comonomer component of the curable composition (e.g., one or more itaconates+one or more methylene malonates). Itaconates may be characterized as diesters of itaconic acid, which has the structure: HOC(=O)CH$_2$C(=CH$_2$)C(=O)OH.

Suitable itaconates may correspond to the structure $R^g$OC(=O)CH$_2$C(=CH$_2$)C(=O)OR$^h$, wherein $R^g$ and $R^h$ are organic groups which are the same as or different from each other. Suitable organic groups include alkyl groups, alkenyl groups, cycloalkyl groups, heterocyclyl groups, alkyl heterocyclyl groups, aryl groups, aralkyl groups, alkaryl groups, heteroaryl groups, alkheteroaryl groups, oxyalkylene groups and polyoxyalkylene groups, which may be substituted or unsubstituted. For example, $R^g$ and $R^h$ may be independently selected from $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which may be optionally substituted by, for example, $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester. Particular examples of suitable $R^g$ and $R^h$ groups include, but are not limited to, methyl, ethyl, n-propyl, isopropyl, n-butyl, t-butyl, cyclopentyl, cyclohexyl, cyclohexylmethyl (Cyc-CH$_2$—, where Cyc=cyclohexyl), phenyl, benzyl, 2-phenylethyl and isobornyl.

Illustrative, non-limiting examples of suitable itaconates include dimethyl itaconate, diethyl itaconate, di-n-butyl itaconate, di-isobutyl itaconate, dicyclohexyl itaconate, alkyl poly(oxyethylene) itaconates, bis(hexafluoroisopropyl) itaconate, diphenyl itaconate, dibenzyl itaconate, ethyl isobornyl itaconate, ethyl cyclohexyl itaconate and the like and combinations thereof.

(Meth)acrylate-Functionalized Compounds b)

The curable compositions of the present invention are further characterized by comprising at least one (meth)acrylate-functionalized compound b). A (meth)acrylate-functionalized compound b) may be described as an organic compound bearing one or more (meth)acrylate functional groups per molecule. As used herein, the term "(meth)acrylate" refers to both acrylate and methacrylate functional groups. (Meth)acrylate-functionalized compounds suitable for use in the present invention may be generally described as ethylenically unsaturated compounds containing at least one carbon-carbon double bond alpha to an ester group (a compound containing at least one α,β-unsaturated ester moiety), in particular a carbon-carbon double bond capable of participating in a free radical reaction or anionic reaction, in particular a reaction initiated by ultraviolet radiation or electron beam radiation. Such reactions may result in a polymerization or curing whereby the (meth)acrylate-functionalized compound becomes part of a polymerized matrix or polymeric chain. In various embodiments of the invention, the (meth)acrylate-functionalized compound may contain one, two, three, four, five or more (meth)acrylate functional groups per molecule. Combinations of multiple (meth)acrylate-functionalized compounds containing different numbers of (meth)acrylate groups may be utilized in the curable compositions of the present invention.

The curable compositions of the present invention thus contain one or more (meth)acrylate functional compounds capable of undergoing free radical and/or anionic polymerization (curing) initiated by exposure to ultraviolet or electron beam radiation. As used herein, the term "(meth)acrylate" refers to methacrylate (—O—C(=O)—C(CH$_3$)=CH$_2$) as well as acrylate (—O—C(=O)—CH=CH$_2$) functional groups. The (meth)acrylate-functionalized compounds may be oligomers or monomers or a combination of oligomer(s) and monomer(s).

Any of the following types of (meth)acrylate-functionalized compounds may, for example, be employed in the curable compositions of the present invention, in combination with one or methylene-containing compounds as co-monomers: monomers such as (meth)acrylate esters of aliphatic mono-alcohols, (meth)acrylate esters of alkoxylated aliphatic mono-alcohols, (meth)acrylate esters of aliphatic polyols, (meth)acrylate esters of alkoxylated aliphatic polyols, (meth)acrylate esters of aromatic ring-containing alcohols, and (meth)acrylate esters of alkoxylated aromatic ring-containing alcohols; and oligomers such as epoxy (meth)acrylates, polyether (meth)acrylates, urethane (meth)acrylates, polyester (meth)acrylates (including amine- and sulfide-modified derivatives thereof); and combinations thereof.

Suitable (meth)acrylate-functionalized oligomers include, for example, polyester (meth)acrylates, epoxy (meth)acrylates, polyether (meth)acrylates, urethane (meth)acrylates (sometimes also referred to as polyurethane (meth)acrylates or urethane (meth)acrylate oligomers) and combinations thereof, as well as amine-modified and sulfide-modified variations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). To prepare the polyester (meth)acrylates, the hydroxyl groups of the polyester polyols are then partially or fully esterified by reacting with (meth) acrylic acid, (meth)acryloyl chloride, (meth)acrylic anhydride or the like. Polyester (meth)acrylates may also be synthesized by reacting a hydroxyl-containing (meth)acrylate such as a hydroxyalkyl (meth)acrylate (e.g., hydroxyethyl acrylate) with a polycarboxylic acid. The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Exemplary polyether (meth)acrylate oligomers include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of epoxides and other oxygen-containing heterocyclic compounds (e.g., ethylene oxide, 1,2-propylene oxide, butene oxide, tetrahydrofuran and combinations thereof) with a starter molecule. Suitable starter molecules include water, hydroxyl functional materials, polyester polyols and amines. Polyetherols may also be obtained by the condensation of diols such as glycols.

Urethane (meth)acrylates (sometimes also referred to as "polyurethane (meth)acrylates") capable of being used in the curable compositions of the present invention include urethanes based on aliphatic and/or aromatic polyester polyols, polyether polyols and polycarbonate polyols and aliphatic and/or aromatic polyester diisocyanates and polyether diisocyanates capped with (meth)acrylate end-groups.

In various embodiments, the urethane (meth)acrylates may be prepared by reacting aliphatic and/or aromatic polyisocyanates (e.g., diisocyanates, triisocyanates) with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl (meth) acrylate or hydroxypropyl (meth)acrylate to provide terminal (meth)acrylate groups. For example, the urethane (meth)acrylates may contain two, three, four or more (meth) acrylate functional groups per molecule. Other orders of addition may also be practiced to prepare the polyurethane (meth)acrylate, as is known in the art. For example, the hydroxyl-functionalized (meth)acrylate may be first reacted with a polyisocyanate to obtain an isocyanate-functionalized (meth)acrylate, which may then be reacted with an OH group terminated polyester polyol, polyether polyol, polycarbonate polyol, polycaprolactone polyol, polydimethysiloxane polyol, polybutadiene polyol, or a combination thereof. In yet another embodiment, a polyisocyanate may be first reacted with a polyol, including any of the aforementioned types of polyols, to obtain an isocyanate-functionalized polyol, which is thereafter reacted with a hydroxyl-functionalized (meth)acrylate to yield a polyurethane (meth)acrylate. Alternatively, all the components may be combined and reacted at the same time.

Any of the above-mentioned types of oligomers may be modified with amines or sulfides (e.g., thiols), following procedures known in the art. Such amine- and sulfide-modified oligomers may be prepared, for example, by reacting a relatively small portion (e.g., 2-15%) of the (meth) acrylate functional groups present in the base oligomer with an amine (e.g., a secondary amine) or a sulfide (e.g., a thiol), wherein the modifying compound adds to the carbon-carbon double bond of the (meth)acrylate in a Michael addition reaction.

Illustrative examples of suitable monomeric (meth)acrylate-functionalized compounds include (meth)acrylated mono- and polyols (polyalcohols) and (meth)acrylated alkoxylated mono-alcohols and polyols. The mono-alcohols and polyols may be aliphatic (including one or more cycloaliphatic rings) or may contain one or more aromatic rings (as in the case of phenol or bisphenol A). "Alkoxylated" means that the base mono-alcohol or polyol has been reacted with one or more epoxides such as ethylene oxide and/or propylene oxide so as to introduce one or more ether moieties (e.g., —CH$_2$CH$_2$—O—) onto one or more hydroxyl groups of the mono-alcohol or polyol, prior to esterification to introduce one or more (meth)acrylate functional groups. For example, the amount of epoxide reacted with the mono-alcohol or polyol may be from about 1 to about 30 moles of epoxide per mole of mono-alcohol or polyol. Examples of suitable mono-alcohols include, but are not limited to, straight chain, branched and cyclic $C_1$-$C_{54}$ mono-alcohols (which may be primary, secondary or tertiary alcohols). For instance, the mono-alcohol may be a $C_1$-$C_7$ aliphatic mono-alcohol. In another embodiment, the mono-alcohol may be a $C_8$-$C_{24}$ aliphatic mono-alcohol (e.g., lauryl alcohol, stearyl alcohol). Examples of suitable polyols include organic compounds containing two, three, four or more hydroxyl groups per molecule such as glycols (diols), e.g., ethylene glycol, 1,2- or 1,3-propylene glycol, or 1,2-, 1,3- or 1,4-butylene glycol, neopentyl glycol, trimethylolpropane, triethylolpropane, pentaerythritol, glycerol and the like.

Representative, but not limiting, examples of suitable monomeric (meth)acrylate-functionalized compounds include: 1,3-butylene glycol di(meth)acrylate, 1,4-butanediol di(meth)acrylate, 1,6-hexanediol di(meth)acrylate, longer chain aliphatic di(meth)acrylates (such as those generally corresponding to the formula H$_2$C=CRC(=O)—O—(CH$_2$)$_m$—O—C(=O)CR'=CH$_2$, wherein R and R' are independently H or methyl and m is an integer of 8 to 24), alkoxylated (e.g., ethoxylated, propoxylated) hexanediol di(meth)acrylates, alkoxylated (e.g., ethoxylated, propoxylated) neopentyl glycol di(meth)acrylates, dodecyl di(meth) acrylates, cyclohexane dimethanol di(meth)acrylates, diethylene glycol di(meth)acrylates, dipropylene glycol di(meth) acrylates, alkoxylated (e.g., ethoxylated, propoxylated) bisphenol A di(meth)acrylates, ethylene glycol di(meth) acrylates, neopentyl glycol di(meth)acrylates, tricyclodecane dimethanol diacrylates, triethylene glycol di(meth)acrylates, tetraethylene glycol di(meth)acrylates, tripropylene glycol di(meth)acrylates, ditrimethylolpropane tetra(meth)acrylates, dipentaerythritol penta(meth)acrylates, alkoxylated (e.g., ethoxylated, propoxylated) pentaerythritol tetra(meth)acrylate, dipentaerythritol penta(meth)acrylates, pentaerythritol tetra(meth)acrylates, alkoxylated (e.g., ethoxylated, propoxylated) trimethylolpropane tri(meth) acrylates, alkoxylated (e.g., ethoxylated, propoxylated) glyceryl tri(meth)acrylates, trimethylolpropane tri(meth) acrylates, pentaerythritol tri(meth)acrylates, tris (2-hydroxy ethyl) isocyanurate tri(meth)acrylates, 2(2-ethoxyethoxy) ethyl (meth)acrylates, 2-phenoxyethyl (meth)acrylates, 3,3, 5-trimethylcyclohexyl (meth)acrylates, alkoxylated lauryl (meth)acrylates, alkoxylated phenol (meth)acrylates, alkoxylated tetrahydrofurfuryl (meth)acrylates, caprolactone (meth)acrylates, cyclic trimethylolpropane formal (meth)acrylates, dicyclopentadienyl (meth)acrylates, diethylene glycol methyl ether (meth)acrylates, alkoxylated (e.g., ethoxylated, propoxylated) nonyl phenol (meth)acrylates, isobornyl (meth)acrylates, isodecyl (meth)acrylates, isooctyl (meth)acrylates, lauryl (meth)acrylates, methoxy polyethylene glycol (meth)acrylates, octyldecyl (meth)acrylates (also known as stearyl (meth)acrylates), tetrahydrofurfuryl (meth) acrylates, tridecyl (meth)acrylates, triethylene glycol ethyl ether (meth)acrylates, t-butyl cyclohexyl (meth)acrylates, dicyclopentadiene di(meth)acrylates, phenoxyethanol (meth)acrylates, octyl (meth)acrylates, decyl (meth)acrylates, dodecyl (meth)acrylates, tetradecyl (meth)acrylates, cetyl (meth)acrylates, hexadecyl (meth)acrylates, behenyl (meth)acrylates, diethylene glycol ethyl ether (meth)acrylates, diethylene glycol butyl ether (meth)acrylates, triethylene glycol methyl ether (meth)acrylates, dodecanediol di (meth)acrylates, dipentaerythritol penta/hexa(meth)acrylates, pentaerythritol tetra(meth)acrylates, alkoxylated (e.g., ethoxylated, propoxylated) pentaerythritol tetra(meth)acrylates, di-trimethylolpropane tetra(meth)acrylates, alkoxylated (e.g., ethoxylated, propoxylated) glyceryl tri(meth) acrylates, and tris (2-hydroxy ethyl) isocyanurate tri(meth) acrylates, and combinations thereof.

The relative proportions of reactive comonomer a) and (meth)acrylate-functionalized compound b) utilized in the curable composition may be varied as may be appropriate depending upon the particular components selected and the properties of the curable composition and the cured composition obtained therefrom which are desired. For example, in various embodiments of the invention, the weight amount in total of reactive comonomer a) (which may be a single reactive comonomer a) or a combination of two or more different reactive comonomers a)) may be from 1 to 99% by weight or from 10 to 90% by weight and the weight amount in total of (meth)acrylate-functionalized compound b) (which may be a single (meth)acrylate-functionalized compound b) or a combination of two or more different (meth) acrylate-functionalized compounds b)) may correspondingly be from 1 to 99% by weight or from 10 to 90% by weight, based on the combined total weight of reactive comonomer a) and (meth)acrylate-functionalized compound b).

Photoinitiators c)

If the curable composition is to be cured using light, such as ultraviolet light, it will generally be desirable to formulate the composition to include c) one or more photoinitiators. However, if electron beam or chemical curing is employed, then the curable composition does not need to contain any photoinitiator.

A photoinitiator is a compound that undergoes a photoreaction on absorption of light, producing reactive species. The reactive species which are generated then initiate polymerization of the reactive components of the curable composition, e.g., the (meth)acrylate-functionalized compound(s). Generally speaking, such polymerization (curing) involves reaction of the carbon-carbon double bonds present in such components. The reactive species may be, for example, a free radical species or an anionic species, in various embodiments of the invention. The photoinitiator may be a photobase generator such as an α-aminoacetophenone, in one embodiment of the invention.

Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof.

Specific examples of suitable photoinitiators include, but are not limited to, 2-methylanthraquinone, 2-ethylanthraquinone, 2-chloroanthraquinone, 2 benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2 diethyloxyacetophenone, diethyloxyacetophenone, 2-isopropylthioxanthone, thioxanthone, diethyl thioxanthone, acetylnaphthalenes, ethyl-p-dimethylaminobenzoate, benzil ketone, α-hydroxy keto, 2,4, 6-trimethylbenzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1, 2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone,3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

Exemplary combinations of suitable photoinitiators include blends of 2-hydroxy-2-methyl-1-phenyl-1-propanone, 2,4,6-trimethylbenzoylphenylphosphinic acid ethyl ester and phenylbis(2,4,6-trimethylbenzoyl) phosphine oxide and blends of 2-hydroxy-2-methyl-1-phenyl-1-propanone and diphenyl (2,4,6-trimethylbenzoyl) phosphine oxide.

If photoinitiator is employed in the curable composition, it may generally be present in a total concentration of up to about 15% by weight based on the total weight of the curable composition (e.g., a concentration of from about 0.1 to about 5% by weight based on the total weight of the curable composition).

Other Components

The curable compositions of the present invention may optionally contain one or more additives instead of c) or in addition to the above-mentioned ingredients a), b) and c). Such additives include, but are not limited to, antioxidants, ultraviolet absorbers, photostabilizers, foam inhibitors, flow or leveling agents, colorants, pigments, dispersants (wetting agents), slip additives, fillers, thixotropic agents, matting agents, thermoplastics such as acrylic resins that do not contain any free radical-polymerizable functional groups, waxes or other various additives, including any of the additives conventionally utilized in the coating, sealant, adhesive, molding or ink arts.

Curing of and Uses for the Curable Compositions

The curable compositions of the present invention are useful as inks (in graphic arts applications, including for food packaging), molding resins, 3D printing resins, coatings (e.g., fiber optic coatings), sealants and adhesives (e.g., UV-curable laminating adhesives, UV-curable hotmelt adhesives), among other potential applications.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition), laminated or adhered articles (wherein a first component of the article is laminated or adhered to a second component by means of the cured composition), or printed articles (wherein graphics or the like are imprinted on a substrate, such as a paper, plastic or metal substrate, using the cured composition).

The curable compositions may be subjected to curing by means of free radical polymerization or other types of polymerization (e.g., anionic or cationic polymerization).

Curing of the curable compositions in accordance with the present invention may be carried out by any suitable method, such as free radical, cationic and/or anionic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof. When used as an adhesive, the composition may be placed between two substrates and then cured, the cured composition thereby bonding the substrates together.

Curing may be accelerated or facilitated by supplying energy to the composition, such as by heating the composition and/or by exposing the composition to a radiation source, such as visible or UV light, infrared radiation, and/or electron beam radiation. Thus, the cured composition may be deemed the reaction product of the curable composition, formed by curing.

The curable compositions of the present invention are particularly well suited to being cured using LED (Light Emitting Diode) curing (e.g., UV LED curing, using radiation from a UV LED device) and for use in high speed applications (such as coatings).

A plurality of layers of a composition in accordance with the present invention may be applied to a substrate surface; the plurality of layers may be simultaneously cured (by exposure to a single dose of radiation, for example) or each layer may be successively cured before application of an additional layer of the composition.

The curable compositions described herein are especially useful as 3D printing resin formulations, that is, compositions intended for use in manufacturing three dimensional articles using 3D printing techniques. Such three dimensional articles may be free-standing/self-supporting and may consist essentially of or consist of a curable composition that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component).

A method of making a three-dimensional article using a curable composition in accordance with the present invention may comprise the steps of:

a) coating a first layer of a curable composition in accordance with the present invention onto a surface;
b) curing the first layer to provide a cured first layer;
c) coating a second layer of the curable composition onto the cured first layer;
d) curing the second layer to provide a cured second layer adhered to the cured first layer; and
e) repeating steps c) and d) a desired number of times to build up the three-dimensional article.

Although the curing steps may be carried out by any suitable means, which will in some cases be dependent upon the components present in the curable composition, in certain embodiments of the invention the curing is accomplished by exposing the layer to be cured to an effective amount of radiation (e.g., electron beam radiation, UV radiation, visible light, etc.).

Accordingly, in various embodiments, the present invention provides a process comprising the steps of:

a) coating a first layer of a curable composition in accordance with the present invention and in liquid form onto a surface;
b) exposing the first layer imagewise to actinic radiation to form a first exposed imaged cross-section, wherein the radiation is of sufficient intensity and duration to cause at least partial curing (e.g., at least 80% or at least 90% curing) of the layer in the exposed areas;
c) coating an additional layer of the curable composition onto the previously exposed imaged cross-section;
d) exposing the additional layer imagewise to actinic radiation to form an additional imaged cross-section, wherein the radiation is of sufficient intensity and duration to cause at least partial curing (e.g., at least 80% or at least 90% curing) of the additional layer in the exposed areas and to cause adhesion of the additional layer to the previously exposed imaged cross-section;
e) repeating steps c) and d) a desired number of times to build up the three-dimensional article.

Various exemplary aspects of the present invention may be summarized as follows:

Aspect 1: A curable composition comprising, consisting essentially of or consisting of:
a) at least one comonomer having structure $R^a R^b C=CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^1$, with each $R^1$ being independently selected from H or an organic group, wherein $R^c$ is H or an alkyl in $C_1$ or $C_2$ and each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring; and b) at least one (meth)acrylate-functionalized compound.

Aspect 2: The curable composition of Aspect 1, wherein each $R^d$, $R^e$, $R^f$ and $R^g$ is independently selected from an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group, an oxyalkylene group or a polyoxyalkylene group, which may be substituted or unsubstituted.

Aspect 3: The curable composition of Aspect 1 or 2, comprising at least one comonomer selected from the group consisting of 1,1-diester-1-alkenes, 1,1-diketo-1-alkenes, 1-ester-1-keto-1-alkenes and itaconates.

Aspect 4: The curable composition of Aspects 1 to 3, comprising at least one comonomer a) wherein $R^a$ and $R^b$ are both —C(=O)O$R^d$ and $R^c$ is H.

Aspect 5: The curable composition of Aspects 1 to 3, comprising at least one comonomer a) wherein $R^a$ and $R^b$ are both —C(=O)$R^f$ and $R^c$ is H.

Aspect 6: The curable composition of Aspects 1 to 3, comprising at least one comonomer a) wherein $R^a$ is —C(=O)O$R^d$, $R^b$ is —C(=O)$R^f$ and $R^c$ is H.

Aspect 7: The curable composition of Aspect 1 or 2, comprising at least one comonomer a) wherein $R^a$ is —C(=O)O$R^d$, $R^b$ is —CH$_2$C(=O)O$R^e$ and $R^c$ is H.

Aspect 8: The curable composition of Aspects 1 to 3, comprising at least one methylene malonate as comonomer a).

Aspect 9: The curable composition of Aspects 1 to 3 and 8, comprising as comonomer a) at least one methylene malonate corresponding to structural formula (I):

(I)

wherein R and R' are the same or different and are independently selected from the group consisting of alkyl groups, alkenyl groups, cycloalkyl groups, heterocyclyl groups, alkyl heterocyclyl groups, aryl groups, aralkyl groups, alkaryl groups, heteroaryl groups, alkheteroaryl groups, oxyalkylene groups and polyoxyalkylene groups, which may be substituted or unsubstituted, or R and R' together form a 5 to 7 membered cyclic or heterocyclic ring, which may be substituted or unsubstituted.

Aspect 10: The curable composition of Aspect 9, wherein R and R' are the same and are selected from the group consisting of $C_1$-$C_{15}$ alkyl and $C_5$-$C_{12}$ cycloalkyl.

Aspect 11: The curable composition of Aspects 1 to 3 and 8 to 10, wherein the at least one comonomer a) comprises at least one methylene malonate selected from the group consisting of dicyclohexyl methylene malonate, di-isobornyl methylene malonate, ethyl isobornyl methylene malonate, dihexyl methylene malonate and diethyl methylene malonate.

Aspect 12: The curable composition of Aspects 1 to 3, wherein it comprises one or more methylene beta-diketone monomers which have a structure (II):

(II)

wherein $R_1$ and $R_2$ are independently $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester; or wherein $R_1$ and $R_2$ are taken together with the atoms to which they are bound to form a 5-7 membered heterocyclic ring which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester.

Aspect 13: The curable composition of any of Aspects 1 to 12, wherein the at least one (meth)acrylate-functionalized compound b) comprises at least one (meth)acrylate-functionalized compound selected from the group consisting of (meth)acrylate esters of aliphatic (non alkoxylated) mono-alcohols, (meth)acrylate esters of alkoxylated aliphatic mono-alcohols, (meth)acrylate esters of aliphatic (non alkoxylated) polyols, (meth)acrylate esters of alkoxylated aliphatic polyols, (meth)acrylate esters of aromatic(non alkoxylated) alcohols, (meth)acrylate esters of alkoxylated aromatic alcohols, epoxy (meth)acrylates, polyether (meth)acrylates, urethane (meth)acrylates, polyester (meth)acrylates, and amine- and sulfide-modified derivatives thereof and combinations thereof.

Aspect 14: The curable composition of any of Aspects 1 to 13, wherein the at least one (meth)acrylate-functionalized compound b) comprises at least one (meth)acrylate-functionalized compound selected from the group consisting of isobornyl (meth)acrylate, ethoxylated trimethylolpropane triacrylates, tricyclodecane dimethanol diacrylate, polyether aliphatic urethane acrylates and polycarbonate urethane acrylates.

Aspect 15: The curable composition of any of Aspects 1 to 14, wherein the curable composition is comprised of from about 1% to about 99% by weight in total of comonomer a) and from about 1% to about 99% by weight in total of (meth)acrylate-functionalized compound b), based on the total weight of comonomer a) and (meth)acrylate-functionalized compound b).

Aspect 16: The curable composition of any of Aspects 1 to 15, wherein the curable composition is comprised of from about 10% to about 90% by weight in total of comonomer a) and from about 10% to about 90% by weight in total of (meth)acrylate-functionalized compound b), based on the total weight of comonomer a) and (meth)acrylate-functionalized compound b).

Aspect 17: The curable composition of any of Aspects 1 to 16, additionally comprising at c) least one photoinitiator.

Aspect 18: A cured composition obtained by curing a curable composition in accordance with any of Aspects 1 to 17.

Aspect 19: A method of making a cured composition, comprising curing a curable composition in accordance with any of Aspects 1 to 17.

Aspect 20: The method of Aspect 19, wherein the curable composition is exposed to radiation.

Aspect 21: The method of Aspect 19 or 20, wherein the curable composition is exposed to ultraviolet radiation or electron beam radiation.

Aspect 22: A method of making a three-dimensional article, comprising the steps of:
a) coating a first layer of a curable composition in accordance with any of Aspects 1 to 17 onto a surface;
b) curing the first layer to provide a cured first layer;
c) coating a second layer of the curable composition onto the cured first layer;
d) curing the second layer to provide a cured second layer adhered to the cured first layer; and
e) repeating steps c) and d) a desired number of times to build up the three-dimensional article.

Aspect 23: The method of Aspect 22, wherein the curing steps are performed by exposing the layer of the curable composition to radiation.

Aspect 24: Use of a curable composition in accordance with any of Aspects 1 to 17 in a coating such as a fiber optic coating, an adhesive such as a UV-curable laminating adhesive or UV-curable hot melt adhesive, a sealant, an ink, a 3D printing resin or a molding resin.

Aspect 25: Use of the curable composition of aspects 1 to 17, in making 3D articles.

Aspect 26: 3D article, wherein it results from the use of a curable composition according to aspects 1 to 17.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition or process using the curable composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

A series of formulations as described in Tables 1 and 2 was prepared and their photocuring characteristics studied using DSC (Differential Scanning Calorimetry) and FTIR (Fourier Transform Infra Red) techniques.

For the photo-DSC studies, one drop of the formulation was deposited in an open aluminum pan, which was then placed in the DSC instrument. The DSC instrument was then operated in isothermal mode at 25° C. and the formulation subjected to 1 sec. UV-light impulses (stopped after 7 impulses of 1 sec). The heat flow was permitted to go back to baseline before applying the next light impulse. The enthalpy (surface below the correspondent peaks) was then calculated. The cumulative enthalpy evolution with time was compared among the different formulations and the state of the sample in the pan (e.g., solid or liquid) was evaluated at the end of the test.

In the photo-FTIR studies, a background spectrum was taken before curing each sample. One drop of the formulation was deposited on the FTIR crystal, which was then regularly exposed to 1 sec UV light impulses. The FTIR spectra were recorded after 1, 2, 3, 4, 5 and 10 sec UV light exposures (multiple 1 sec impulses). A final 20 sec UV-light impulse was then applied and another FTIR spectrum was recorded. The height of the absorbance peak at about 810 $cm^1$ was recorded. The physical state of the sample at the end of the test (e.g., solid, liquid) was also recorded.

The following components were used in the formulations. In each case, the formulation additionally contained 0.5% by weight 2,4,6-trimethylbenzoyl-diphenyl-phosphineoxide (TPO) photoinitiator. In formulations containing two reactive components, the components were present in equal weight amounts (50/50). All monomers, oligomers and initiators were mixed in the reported proportions and allowed to homogenize between room temperature (ca. 21° C.) and 60° C. for 48 hours.

"SR506": Sartomer SR506 (isobornyl acrylate).
"DCHMM": dicyclohexyl methylene malonate.
"SR423": Sartomer SR423 (isobornyl methacrylate).

TABLE 1

DSC Results

| Formulation (+0.5% TPO) | Cumulative enthalphy (J/g) | | | | | | | Physical state |
|---|---|---|---|---|---|---|---|---|
| | 1 s | 2 s | 3 s | 4 s | 5 s | 6 s | 7 s | 7 s |
| SR506 | 203.4 | 332.3 | 332.3 | 332.3 | 332.3 | 332.3 | 332.3 | solid |
| DCHMM | 26.7 | 54.8 | 73.5 | 82.4 | 87.8 | 91.9 | 95.4 | soft solid |
| SR423 | 13.0 | 24.3 | 31.8 | 34.8 | 38.8 | 43.6 | 49.3 | liquid |
| SR506/DCHMM 50/50 | 158.1 | 199.5 | 202.5 | 205.0 | 207.3 | 209.5 | 211.6 | solid |
| SR423/DCHMM 50/50 | 28.5 | 57.4 | 88.0 | 121.3 | 127.7 | 130.2 | 132.4 | soft solid |
| SR506/SR423 50/50 | 19.7 | 37.0 | 47.2 | 52.5 | 56.2 | 59.5 | 62.6 | liquid |
| DEMM | 8.1 | 13.9 | 17.3 | 19.8 | 22.0 | 24.3 | 26.6 | liquid |

TABLE 2

FTIR Results

| Formulation (+0.5% TPO) | Height peak ≈ 808 cm−1 | | | | | | | | Physical state |
|---|---|---|---|---|---|---|---|---|---|
| | t0 | t0 + 1 s | t0 + 2 s | t0 + 3 s | t0 + 4 s | t0 + 5 s | t0 + 10 s | t0 + 30 s | t0 + 30 s |
| SR506 | 0.159 | 0.101 | 0.062 | 0.0529 | 0.0513 | 0.0489 | 0.039 | 0.0376 | solid |
| Conversion | 0 | 36% | 61% | 67% | 68% | 69% | 75% | 76% | |
| DCHMM | 0.063 | 0.057 | 0.05 | 0.041 | 0.03 | 0.027 | 0.02 | 0.019 | solid |
| Conversion | 0 | 10% | 21% | 35% | 52% | 57% | 68% | 70% | |
| SR423 | 0.0812 | 0.0787 | 0.0778 | 0.0775 | 0.0776 | 0.0774 | 0.07735 | 0.0773 | liquid |
| Conversion | 0 | 3% | 4% | 5% | 4% | 5% | 5% | 5% | |
| SR506/DCHMM 50/50 | 0.113 | 0.101 | 0.067 | 0.04 | 0.036 | 0.034 | 0.03 | 0.028 | solid |
| Conversion | 0 | 11% | 41% | 65% | 68% | 70% | 73% | 75% | |
| SR423/DCHMM 50/50 | 0.0558 | 0.0536 | 0.0515 | 0.0495 | 0.0475 | 0.0419 | 0.0226 | 0.021 | solid/liquid |
| Conversion | 0 | 4% | 8% | 11% | 15% | 25% | 59% | 62% | |
| SR506/SR423 50/50 | 0.112 | 0.108 | 0.107 | 0.106 | 0.106 | 0.107 | 0.107 | 0.107 | liquid |
| Conversion | 0 | 4% | 4% | 5% | 5% | 4% | 4% | 4% | |

Figure 1:
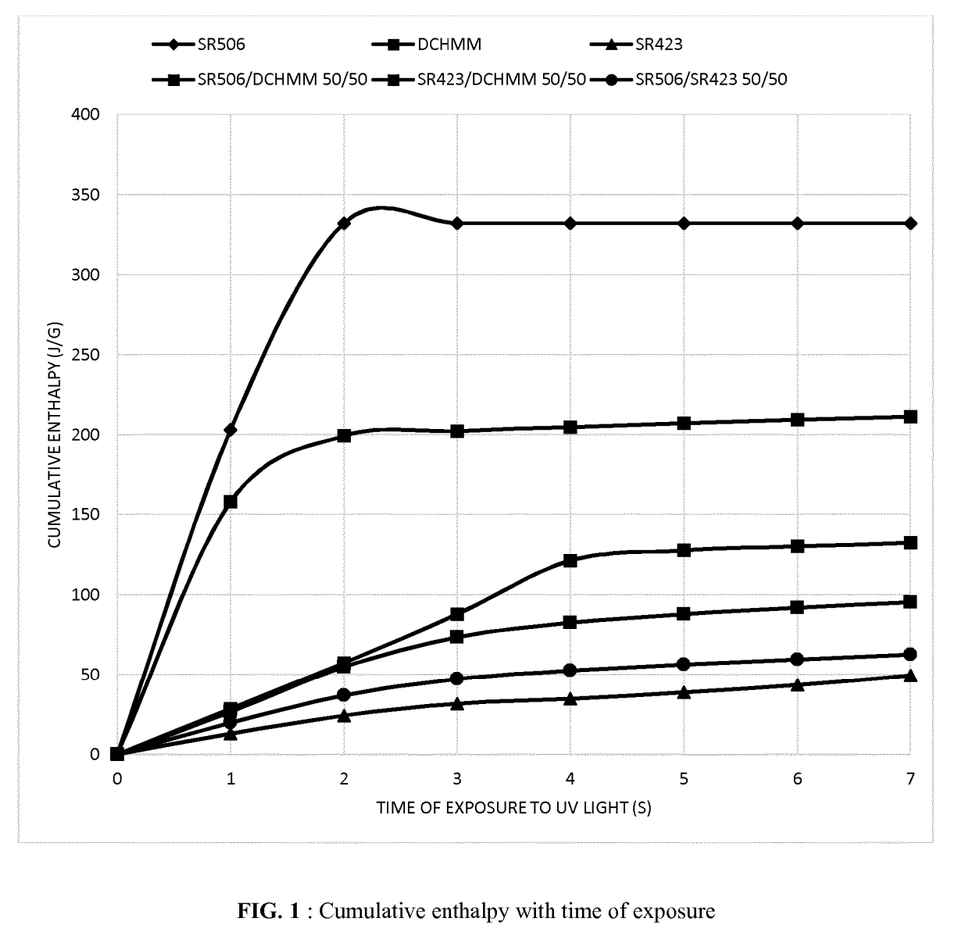
FIG. 1 shows the results observed by DSC, wherein the cumulative enthalpy versus the time of exposure to ultraviolet light is plotted.

FIG. 1 shows the results observed by DSC, wherein the cumulative enthalpy versus the time of exposure to ultraviolet light is plotted.

Figure 2:
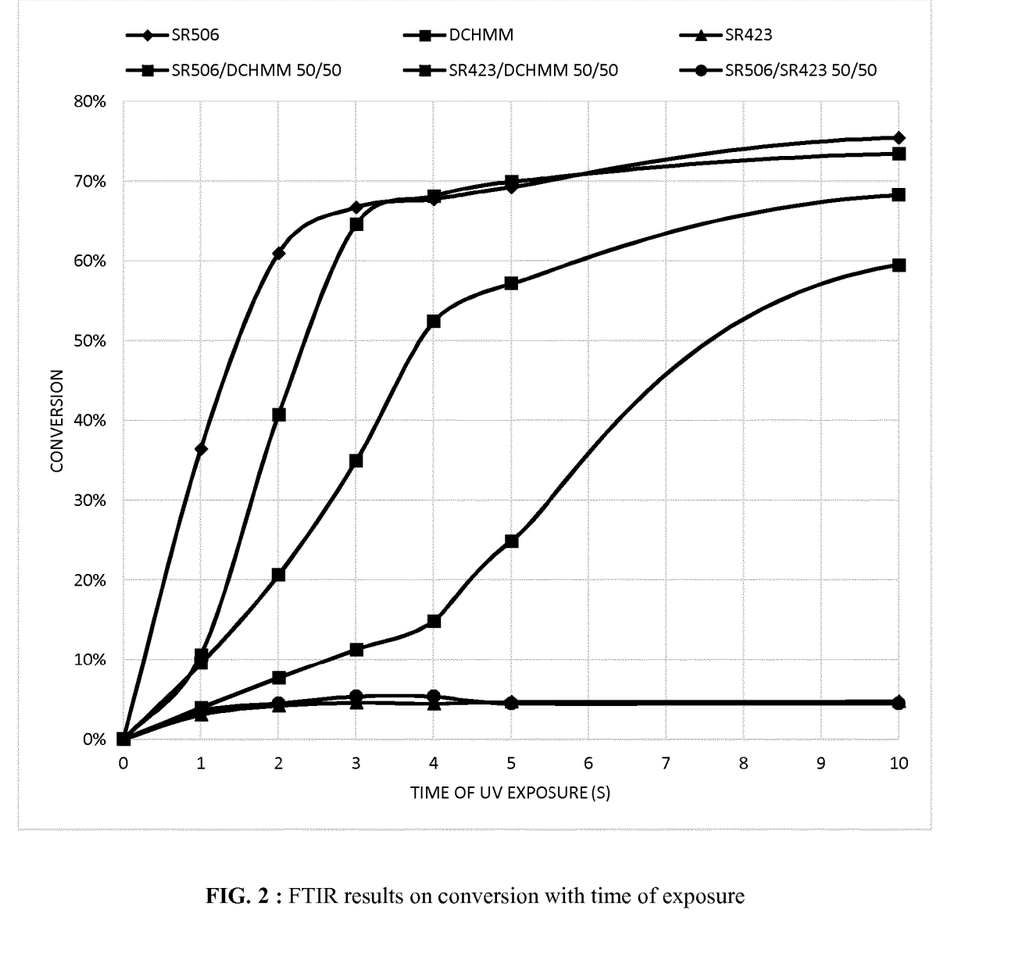
FIG. 2 shows the results observed by FTIR, wherein % conversion of the starting material(s) versus time of exposure to ultraviolet light is plotted.

FIG. 2 shows the results observed by FTIR, wherein % conversion of the starting material(s) versus time of exposure to ultraviolet light is plotted.

The data shown in FIGS. 1 and 2 suggest that the presence of methylene malonate monomers substantially increases the rates of both double bond conversion (reaction) and the formation of solid articles, relative to formulations that contain only methacrylate monomers or combinations of acrylate and methacrylate monomers (but no methylene malonate monomer). Accordingly, incorporating methylene malonate monomer into curable compositions based on (meth)acrylates helps to improve the curing characteristics of such curable compositions, thereby making such curing processes faster and/or more efficient.

A further series of formulations was prepared having the compositions shown in Table 3. The amount of each component in the formulations is expressed in weight percent, based on the total weight of the listed components. Each formulation additionally contained photoinitiator. The components used were as follows:

"CN9023": Sartomer CN9023 polyether aliphatic urethane acrylate ($M_n$=ca. 2500 Daltons).

"CN8881": Sartomer CN8881 polycarbonate urethane acrylate ($M_n$=ca. 1800 Daltons).

"DEMM": diethyl methylene malonate.

"DHMM": dihexyl methylene malonate.

"DCHMM": dicyclohexyl methylene malonate.

"SR506": Sartomer SR506 (isobornyl acrylate).

"SR833": Sartomer SR833 (tricyclodecane dimethanol diacrylate).

"SR454": Sartomer SR454 (ethoxylated (3 EO) trimethylolpropane triacrylate).

TABLE 3

Formulation compositions

| Formulation | % CN9023 | % CN8881 | % DEMM | % DHMM | % DCHMM | % SR506 | % SR833 | % SR454 |
|---|---|---|---|---|---|---|---|---|
| 1 | | 50 | | | 16.67 | 16.67 | | 16.67 |
| 2 | 50 | | | | | | 25 | 25 |
| 3 | 50 | | 12.5 | 12.5 | 12.5 | | | 12.5 |
| 4 | | 50 | 12.5 | 12.5 | 12.5 | 12.5 | | |
| 5 | | 50 | | | | 25 | 25 | |
| 6 | | 50 | | 25 | | | | 25 |
| 7 | 50 | | | 25 | | 25 | | |
| 8 | 50 | | 12.5 | | 12.5 | 12.5 | 12.5 | |
| 9 | | 50 | | 16.67 | 16.67 | | 16.67 | |
| 10 | 50 | | 16.67 | | | 16.67 | | 16.67 |
| 11 | 50 | | 16.67 | 16.67 | | | 16.67 | |
| 12 | | 50 | 10 | 10 | | 10 | 10 | 10 |
| 13 | | 50 | 12.5 | | 12.5 | | 12.5 | 12.5 |
| 14 | 50 | | | 10 | 10 | 10 | 10 | 10 |
| 15 | | 50 | 50 | | | | | |
| 16 | 50 | | | | 50 | | | |
| 17 | | 50 | | | | 25 | 25 | |
| 18 | | 50 | | | 50 | | | |
| 19 | | 50 | | | | 50 | | |

Table 4 lists the viscosity of each formulation in its uncured state and also various mechanical properties of each formulation once photocured.

TABLE 4

Viscosity and mechanical performances of tested formulations of table 3

| Formulation | η @25 C. (cP or mPa · s) | E impact abs (mJ) | Hardness (A) | Tensile Strength (psi/MPa) | Elongation (%) | Tangential Modulus (psi/MPa) |
|---|---|---|---|---|---|---|
| CN8881 + DEMM | 699 | 993 | 40 | 757/5.219 | 402 | 223/1.538 |
| CN8881 + DCHMM | 11791 | 994 | 98 | 4191/28.90 | 161 | 46704/322.0 |
| CN8881 + SR506 | 4575 | 283 | 99 | 3916/27.00 | 151 | 61334/422.9 |
| CN8881 + SR506 + SR833 | 7645 | 306 | 100 | 6109/42.12 | 18 | 90622/624.8 |
| CN8881 + DCHMM + SR506 | 5802 | 257 | 99 | 3904/26.92 | 127 | 61796/426.1 |
| CN8881 + DHMM + SR454 | 25588 | 196 | 97 | 152/1.05 | 7 | 296/2.04 |
| CN9023 + DCHMM | 2458 | 993 | 61 | 1013/6.984 | 472 | 620/4.27 |
| CN9023 + DHMM + SR506 | 2437 | 1000 | 13 | 654/4.51 | 492 | 204/1.41 |
| CN9023 + SR833 + SR454 | 3030 | 137 | 98 | 1807/12.46 | 9 | 21027/145.0 |

The addition of DCHMM to (meth)acrylate formulations results in mechanical properties (especially tensile strength, elongation, and modulus) that are superior to those of analogous formulations containing isobornyl acrylate, albeit with higher viscosity. Isobornyl acrylate is also known to have a pronounced odor that DCHMM does not. Despite its odor, isobornyl acrylate is widely used as a reactive diluent in (meth)acrylate formulations because of its high $T_g$ and low functionality, which allows for final materials that are relatively strong and rigid at room temperature while still being relatively more flexible than (meth)acrylic formulations that have high $T_g$s through high crosslink densities.

The invention claimed is:

1. A curable composition comprising
   a) at least one comonomer having structure $R^aR^bC=CHR^c$, wherein $R^a$ and $R^b$ are the same as or different from each other and are selected from —C(=O) $XR^d$ and —C(=O)$R^f$, wherein X is O or NR', wherein $R^1$ is H or an organic group, wherein $R^c$ is H or methyl or ethyl and $R^d$ is H, alkali metal, or an organic group, and $R^f$ is an organic group; or wherein $R^d$ and $R^f$ are taken together with the atoms to which they are bound to form a ring; and
   b) at least one (meth)acrylate-functionalized compound.

2. The curable composition of claim 1, wherein each $R^d$ and $R^f$ is independently selected from the group consisting of an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group, an oxyalkylene group or a polyoxyalkylene group, which is substituted or unsubstituted.

3. The curable composition of claim 1, comprising at least one comonomer a) selected from the group consisting of 1,1-diester-1-alkenes, 1,1-diketo-1-alkenes, and 1-ester-1-keto-1-alkenes.

4. The curable composition of claim 1, comprising at least one comonomer a) wherein $R^a$ and $R^b$ are both —C(=O) $OR^d$ and $R^c$ is H.

5. The curable composition of claim 1, comprising at least one comonomer a) wherein $R^a$ and $R^b$ are both —C(=O)$R^f$ and $R^c$ is H.

6. The curable composition of claim 1, comprising at least one comonomer a) wherein $R^a$ is —C(=O)$OR^d$, $R^b$ is —C(=O)$R^f$ and $R^c$ is H.

7. The curable composition of claim 1, comprising at least one methylene malonate as comonomer a).

8. The curable composition of claim 1, comprising as comonomer a) at least one methylene malonate corresponding to structural formula (I):

wherein R and R' are the same or different and are independently selected from the group consisting of alkyl groups, alkenyl groups, cycloalkyl groups, heterocyclyl groups, alkyl heterocyclyl groups, aryl groups, aralkyl groups, alkaryl groups, heteroaryl groups, alkheteroaryl groups, oxyalkylene groups and polyoxyalkylene groups, which is substituted or unsubstituted, or R and R' together form a 5 to 7 membered cyclic or heterocyclic ring, which is substituted or unsubstituted.

9. The curable composition of claim 8, wherein R and R' are the same and are selected from the group consisting of $C_1$-$C_{15}$ alkyl and $C_5$-$C_{12}$ cycloalkyl.

10. The curable composition of claim 1, wherein the at least one comonomer a) comprises at least one methylene malonate selected from the group consisting of dicyclohexyl methylene malonate, di-isobornyl methylene malonate, ethyl isobornyl methylene malonate, dihexyl methylene malonate and diethyl methylene malonate.

11. The curable composition of claim 1, wherein it comprises one or more methylene beta-diketone monomers which have a structure (II):

(II)

wherein $R_1$ and $R_2$ are independently $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which is optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester;

Or wherein $R_1$ and $R_2$ are taken together with the atoms to which they are bound to form a 5-7 membered heterocyclic ring which is optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester.

12. The curable composition of claim 1, wherein the at least one (meth)acrylate-functionalized compound b) comprises at least one (meth)acrylate-functionalized compound selected from the group consisting of (meth)acrylate esters of aliphatic mono-alcohols (non alkoxylated), (meth)acrylate esters of alkoxylated aliphatic mono-alcohols, (meth)acrylate esters of aliphatic polyols (non alkoxylated), (meth)acrylate esters of alkoxylated aliphatic polyols, (meth)acrylate esters of aromatic alcohols (non alkoxylated), (meth)acrylate esters of alkoxylated aromatic alcohols, epoxy (meth)acrylates, polyether (meth)acrylates, urethane (meth)acrylates, polyester (meth)acrylates, and amine—and sulfide-modified derivatives thereof and combinations thereof.

13. The curable composition of claim 1, wherein the at least one (meth)acrylate-functionalized compound b) comprises at least one (meth)acrylate-functionalized compound selected from the group consisting of isobornyl (meth)acrylate, ethoxylated trimethylolpropane triacrylates, tricyclodecane dimethanol diacrylate, polyether aliphatic urethane acrylates and polycarbonate urethane acrylates.

14. The curable composition of claim 1, wherein the curable composition is comprised of from about 1% to about 99% by weight in total of comonomer a) and from about 1% to about 99% by weight in total of (meth)acrylate-functionalized compound b), based on the total weight of comonomer a) and (meth)acrylate-functionalized compound b).

15. A cured composition obtained by curing a curable composition in accordance with claim 1.

16. A method of making a cured composition, comprising curing a curable composition in accordance with claim 1.

17. A method of making a three-dimensional article, comprising the steps of:
a) coating a first layer of a curable composition in accordance with claim 1 onto a surface;
b) curing the first layer to provide a cured first layer;
c) coating a second layer of the curable composition onto the cured first layer;
d) curing the second layer to provide a cured second layer adhered to the cured first layer; and
e) repeating steps c) and d) a desired number of times to build up the three-dimensional article.

18. The curable composition of claim 1, wherein the curable composition is a coating, an adhesive, a sealant, an ink, a 3D printing resin or a molding resin.

19. The cured composition according to claim 15, wherein the cured composition is a 3D article.

\* \* \* \* \*